(12) United States Patent
    Koshurinov

(10) Patent No.:    US 12,656,452 B2
(45) Date of Patent:      Jun. 16, 2026

(54) TRANSCEIVER DEVICE FOR A HOMODYNE RADAR

(71) Applicant: Ivan Evgenjevich Koshurinov,
      Nizhniy Novgorod (RU)

(72) Inventor: Ivan Evgenjevich Koshurinov,
      Nizhniy Novgorod (RU)

( * ) Notice: Subject to any disclaimer, the term of this patent is extended or adjusted under 35 U.S.C. 154(b) by 244 days.

(21) Appl. No.: 18/703,270

(22) PCT Filed: Oct. 17, 2022

(86) PCT No.: PCT/RU2022/050330
    § 371 (c)(1),
    (2) Date: Apr. 19, 2024

(87) PCT Pub. No.: WO2023/068970
    PCT Pub. Date: Apr. 27, 2023

(65) Prior Publication Data
    US 2024/0410976 A1     Dec. 12, 2024

(30) Foreign Application Priority Data

Oct. 19, 2021    (RU) ................................ 2021130494

(51) Int. Cl.
    *G01S 7/35*        (2006.01)
    *G01S 13/32*     (2006.01)

(52) U.S. Cl.
    CPC .............. *G01S 7/352* (2013.01); *G01S 13/32* (2013.01)

(58) Field of Classification Search
    CPC combination set(s) only.
    See application file for complete search history.

(56) References Cited

U.S. PATENT DOCUMENTS 4,360,810 A     11/1982   Landt
5,872,537 A      2/1999   Siweris
            (Continued)

FOREIGN PATENT DOCUMENTS

RU      2239845 C2    11/2004
RU      2255352 C2     6/2005
            (Continued)

OTHER PUBLICATIONS

«Некоторые излучением», возможности корреляционной обработки сигнала гомодинного радиолокатора с непрерывным частотно-модулированным Известия ВУЗов. Радиофизика, Tom XL VIII, № 10-11, 2005, СТр.869-875, рис 2 (Some Possibilities for Correlation Processing of Homodyne Radar Signal with Continuous Frequency Modulated Radiation, Izvestia VUZov, Radiofizika, vol. XLVIII, No. 10 to 11, 2005, pp. 869 to 875, FIG.2).

*Primary Examiner* — Vladimir Magloire
*Assistant Examiner* — Eric K Hodac
(74) *Attorney, Agent, or Firm* — MUNCY, GEISSLER, OLDS & LOWE, P.C.

(57)       ABSTRACT

To maximize range of a homodyne radar, alternating radiation of continuous FMCW and quasi-continuous pulsed FMiCW fragments of a probing signal is used. A pulse modulator and power amplifier are connected to a transmission channel between an FM signal generator and an output to an antenna-feeder device. A homodyne filter is connected to each receiving channel between a mixer output and input of a homodyne signal amplifier. The homodyne filter suppresses the spectral components of the mixer signal that exceed the filter cutoff frequency set to be lower than the pulse modulation frequency but higher than the maximum frequency of the homodyne signal calculated for the maximum set distances and speeds of the reflecting targets.

1 Claim, 1 Drawing Sheet

(56) References Cited

U.S. PATENT DOCUMENTS

| | | | | |
|---|---|---|---|---|
| 2013/0106648 | A1 | 5/2013 | White et al. | |
| 2019/0086517 | A1* | 3/2019 | de Mersseman | ....... G01S 17/32 |
| 2021/0124050 | A1* | 4/2021 | Puglia | .................... G01S 17/10 |

FOREIGN PATENT DOCUMENTS

| | | | |
|---|---|---|---|
| RU | 186880 | U1 | 2/2019 |
| RU | 2689397 | C1 | 5/2019 |
| WO | 2008048318 | A2 | 4/2008 |

* cited by examiner

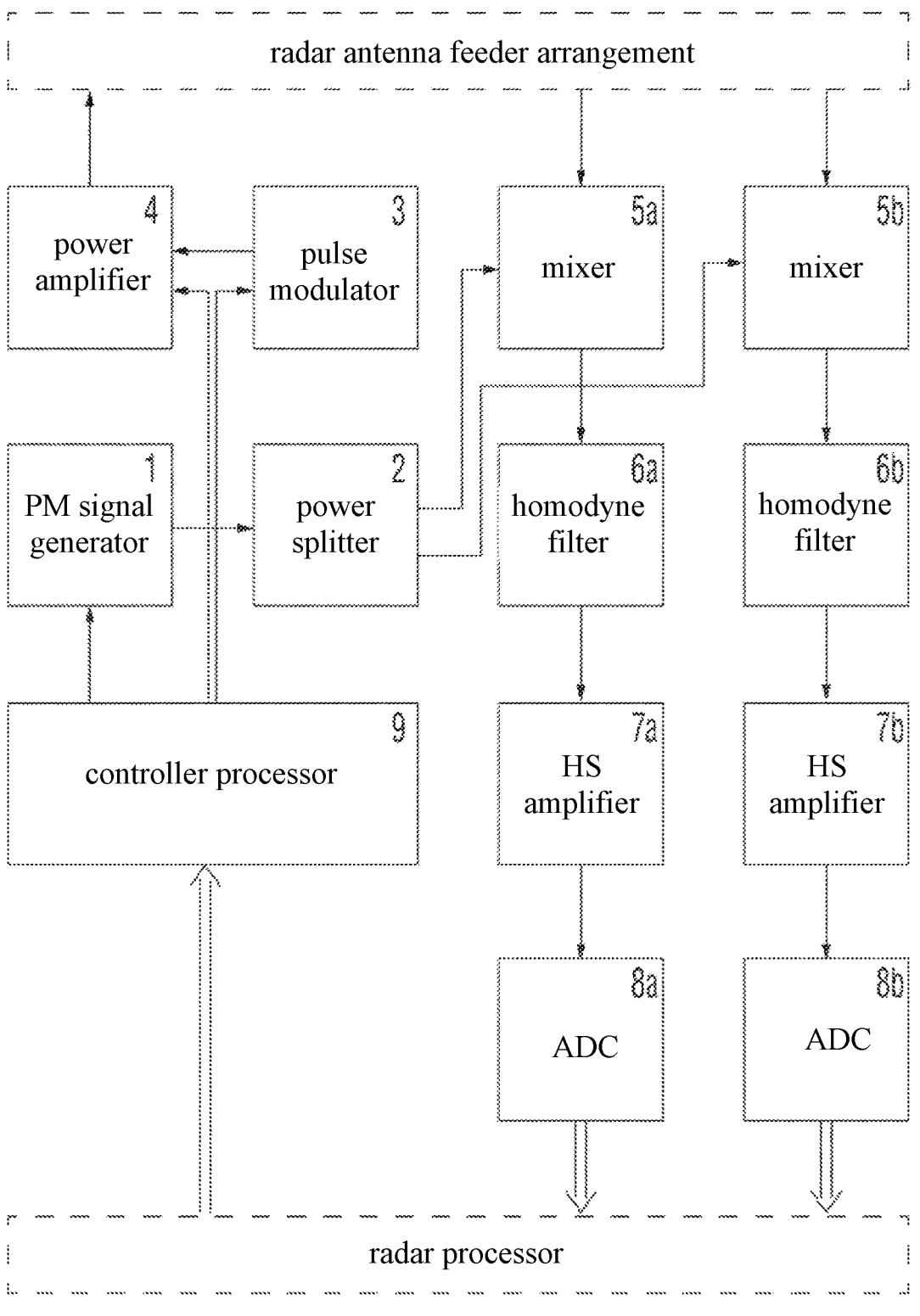

TRANSCEIVER DEVICE FOR A HOMODYNE RADAR

BACKGROUND OF THE INVENTION

Field of the Invention

The present device belongs to the field of electronic engineering or, more specifically, short range radiolocation and can be used as a functional assembly of radars for measuring distances, and angular coordinates of vehicles and pedestrians (hereinafter referred to as the reflectors) in traffic control and collision prevention systems.

Brief Discussion of the Related Art

Short range radiolocation systems (hereinafter referred to as the radars) have been widely used for situational monitoring both at major traffic routes and in site security systems in recent decades. Their primary benefit is the possibility of presenting hard data on coordinates and speeds of reflectors within surveillance ranges at any time of day and under any weather conditions. Stringent cost, weight and size requirements contribute to wide use of homodyne transceiver devices in such radars.

A classical example of a similar invention is a homodyne frequency modulated continuous wave (FMCW) radar where the receiver mixer receives the portion of the emitted probing frequency modulated (FM) signal (PS) in the heterodyne form (see the Radiolocation Guide Book edited by Skolnik, volume 3 of 4, sections 4.9-4.10). This type of radars using linear frequency modulation (LFM) of the PS and digital processing of the homodyne signal are the most widespread. The important feature of FMCW radars being the possibility of monitoring spaces at minimum distances to reflectors (the short range) is accompanied with the drawback inherent in all radiolocation systems using continuously emitted signals. This drawback is sensitivity reduction of receivers under the influence of amplitude noise (AN) of the emitted signal entering unavoidably into the receiving path of the radar due to imperfect insulation of receiving channels from ingress of probing signal noises. This effect results into potential reduction and limiting of the radar ultimate range to the "short range". The drawback is ruled out by emitting the quasi-continuous pulsed (QCP) FMiCW signal generated by pulse modulation of the FMCW signal. "Long range" potentials of such radars are improved with pulse modulation of the emitted signal and with receiving of weak reflected signals within the interval between emission pulses where there are no emitted signal noises.

One of the examples is US patent WO2008048318A2 being also a similar invention. The benefit of this solution and its other peers being the possibility of "long range" operation is accompanied with the unavoidable drawback of pulse systems being complicated receiving of reflector signals within "the short range".

The present invention solves the problem of expanding homodyne radar measurement distances with sequential combined usage of the FMCW mode for operation within short ranges and the FMiCW mode for operation within long ranges of measured distances, respectively.

The closest prior art and prototype of the present invention is the transceiver device for the FMCW radar with correlation processing of the homodyne signal (Some Possibilities for Correlation Processing of Homodyne Radar Signal with Continuous Frequency Modulated Radiation, Izvestia VUZov, Radiofizika, Vol. XLVIII, Nos. 10 to 11, 2005, pp. 869 to 875, FIG. 2). The radar uses the continuous phase modulated emitted signal and includes the antenna-feeder arrangement (AFA) and transceiver device (TCD) connected with microwave inputs and output. The TCD contains the source of the probing signal phase modulated by the processor (hereinafter referred to as the PM signal generator) connected to the AFA, and the receiving channel that includes the mixer with its inputs connected to the generator and the AFA output, and its output connected to the processor via the homodyne signal (HS) amplifier. The processor controls the TCD parameters and computes two-dimensional (distance and speed) matrices of correlation factors (functions) between the output digital homodyne signal of the transceiver device and the matrices of baseline signals. Extreme values of the factors are used for identification of the reflectors, while string and column numbers of the matrices are used to determine the distances and speeds of the reflectors. As the number of matrix columns and strings as well as sizes of their elements are theoretically unlimited, the real limit distances and speeds of the reflectors depend on the technical parameters of the system and, first of all, with the parameters of the transceiver device.

BRIEF DESCRIPTION OF THE DRAWINGS

The sole figure illustrates a functional (structural) diagram of the transceiver device of the present invention.

SUMMARY OF THE INVENTION

The invention aims at creating the transceiver device being the component of the homodyne radar (a hybrid of FMCW and FMiCW radars) capable of ensuring alternate usage of two probing signal modes being the continuous one (for short range reflectors), and the quasi-continuous pulse one (for the long range). The present invention strives to remove the abovementioned drawbacks of the prototype by additionally using the emitted signal pulse modulate mode with receiving the reflected long range signal within intervals between emission pulses. Here, increasing mean emitting power may improve the radar potential while the algorithms for digital processing of the received signal are preserved as the transceiver device rules out pulse modulation of the homodyne signal at the stage of analog processing thereof.

The problem at hand is solved by improving the transceiver device of the homodyne radar containing the transmitting and receiving channels connected with the microwave output and inputs to the antenna feeder arrangement, and to the radar processor with digital inputs and outputs. The transmitting channel connected to the microwave output of the device and containing the source (being the master generator of the probing signal in the form of the phase modulated fragment sequence (hereinafter referred to as the PM signal generator), the controller processor connected to the phase control input of the generator, and to the radar processor as well as the power splitter with its input connected to the generator output and one of its outputs to the microwave output of the device) includes, in accordance with the invention, the additional pulse modulator and the power amplifier that are connected to the controller processor with control circuits of the pulse modulation mode and the power output level. Here, each receiving channel connected to one of the microwave inputs of the device and containing the series connected mixer with its input connected to the microwave input of the device and the corresponding output of the power splitter, the homodyne signal amplifier, and the analog-to-digital converter connected to the digital output of the device, $$E_n^{osc}(t) = E_0^{osc} \cos[\omega_0 t + \varphi_{mn}(t)], \qquad (1)$$

where $\omega_0 = 2\pi f_0$ is the carrier frequency of the probing signal; $\varphi_{mn}(t)$ is the phase variation (modulation) pattern for the n-th fragment set by the controller processor. The phase modulation durations $T_{frn}$ and patterns $\varphi_{mn}(t)$ of fragment may differ within a packet. The probing signal frequency variation (frequency modulation) function for the n-th fragment is a derivative $\omega_{mn}(t) = d\varphi_{mn}(t)/dt$ and the frequency variation range of the fragment $\Delta\omega_{0n} = 2\pi\Delta f_{0n} = |d\varphi_{mn}(t)/dt|_{max} - |d\varphi_{mn}(t)/dt|_{min}$ is the difference between the maximum and minimum frequencies of the PS determining the distance resolution of the radar. The transmitting antenna emits the fragment (1) amplified and (on startup of the pulse mode) pulse modulated in accordance with the pattern $A_{am}(t)$ (the pulse repetition frequency $f_{am}$, the discretionary pulse rate) (the fragment number n is omitted for simplification):

$$E^{tr}(t) = E_0^{osc} A_{am}(t) \cos[\omega_0 t + \varphi_m(t)]. \qquad (2)$$

The signal (1) is suppled to the heterodyne input of the microwave mixer via the attenuating power splitter $A^{mix}$ $$E^{mix}(t) = E_0^{osc} A^{mix} \cos[\omega_0 t + \varphi_m(t)] \qquad (1a)$$

the homodyne filter is included additionally in accordance with the invention between the mixer output and the homodyne signal amplifier for depressing spectral components of the mixer input signal that exceed the filter cut-off frequency set lower than the pulse modulation frequency but higher than the maximum fragment homodyne signal frequency calculated for the reflectors with maximum set distance and radial speed values. As a result, the radar combines the continuous (FMCW) emitted signal capability within the short range and the pulse (FMiCW) emitted signal capability within the long range while preserving the shape of the output homodyne signal and digital processing algorithms thereof.

Further principal criteria of the invention are detailed with mathematical analysis. The FM signal generator controlled by the controller processor generates the probing signal (PS) in the form of the fragment or sequence (packet) of N fragments with their durations $T_{frn}$ phase modulated by the controller processor signal as follows:

The signal reflected from the set of K reflectors and the received fragment signal are a sum total of phase $\varphi_m(t-\tau_k)$ and amplitude $A_{am}(t-\tau_k)$ modulated oscillations held for a certain time with their carrier frequencies modified by Doppler shift magnitude $$\omega_k^D:$$

4

$$E_K^{res}(t) = \sum_K E_{0k}^{res} A_{am}(t-\tau_k) \cos[(\omega_0 + \omega_k^D)(t-\tau_k) + \varphi_m(t-\tau_k)], \qquad (3)$$

where $$E_{0k}^{res}$$

is the EMF of the signals "in the terminals" of the receiving antenna; $L_k$ is the distance of the k-th reflector;

$$\omega_k^D = -2\omega_0 V_k/c$$

is the Doppler shift frequency of the received reflected signal, and $V_k = dL_k/dt$ is the radial speed of the k-th reflector.

The received signals (3) and the output signal of the tapper (1a) enter the active analog element of the microwave mixer (such as a semiconductor diode) generating the signal $e^x(t)$ described as the multiple of functions (1a) and (3). Having isolated the energy parameters $$(E_0^{osc}, E_{0k}^{res})$$

determined under the primary radiolocation distance equation known from the pertinent art, we convert (3) into the normed function (4) of the fragment signal as follows:

$$e_k^x(t) = A_{am}(t-\tau_k) \cos[\omega_0 t + \varphi_{mn}(t)] \cos[(\omega_0 + \omega_k^D)(t-\tau_k) + \varphi_m(t-\tau_k)], \qquad (4)$$

which is the pair of summands with the sum total (5) and difference (6) of phases of multipliers (4):

$$e_k^{x+}(t) = A_{am}(t-\tau_k) \cos[(2\omega_0 + \omega_k^D)t - \Delta\varphi_{0k} + \varphi_{mn}(t) + \varphi_m(t-\tau_k)] \qquad (5)$$

$$e_k^{x-}(t) = A_{am}(t-\tau_k) \cos[\omega_k^D t - \Delta\varphi_{0k} - \Delta\varphi_m(t \cdot \tau_k)], \qquad (6)$$

where $\Delta\varphi_{0k} = \omega_0 \tau_k$, $\Delta\varphi_m(t. \tau_k) = \varphi_m(t) - \varphi_m(t-\tau_k))$.

The problem of the conventional version of the heterodyne mixer is generation and output of oscillations with difference of input phases (6) and component depression (5) with the summary frequency (phase) of input signals. The function is implemented using various methods such as the low frequency filter structurally combined with the mixer. These operations result into the preservation of both phase and pulse modulate of the beat signal or difference signal (6). Generally, similar inventions use this option. Its drawback is more complicated digital signal processing (6). The present invention suggest using amplitude demodulation of the mixer output signal (6) by including the additional homodyne filter (HF) between the mixer output and the amplifier input to depress the upper frequency components of the signal (6) resulting from pulse modulation. For this purpose, the filter cut-off frequency=$\omega^{hf}$ is set to be significantly lesser than the pulse repetition frequency but greater than the maximum reference frequency of the homodyne signal for preservation of useful information. Here, we use the fact known from the pertinent art that the upper frequency of the signal spectrum (6) for homodyne reception increases as reflector speeds and distances increase, and is calculated easily with the PM fragment function set. In the present invention, the pulse signal (6) is detected with the mixer and the homodyne with the resulting normed continuous amplified frequency-limited homodyne signal of the n-th fragment of the k-th reflector existing within the time interval $\tau_{max} \div T_{fr}$ becomes as follows (k and n indexes are also omitted hereinafter):

$$u^{hs}(t) = \cos[\omega^D t - \Delta\varphi_0 - \Delta\varphi_m(t \cdot \tau)]. \tag{7}$$

Where $\tau_{max}$ is the signal lag time at the maximum set distance of the reflector and $T_{fr}$ is the duration of the relevant fragment. It is evident that, ideally, the signal (7) has no pulse modulation and the radar transceiver device switches from the continuous probing signal mode into the quasi-continuous (pulse) mode merely by turning on the pulse modulator. Here, we do not consider any energy matters or any other features of initial processing of quasi-continuous pulse signals (in particular, the input circuits protection of the receiver) known from the pertinent art.

The homodyne signal (7) of the fragment is a complex combination of the two noncoherent oscillations being the harmonic oscillation with the Doppler shift frequency ($\omega^D$), and the wide-band modulation oscillation (frequency $\Delta\omega_m$ ((t. $\tau$))=$\Delta\varphi_m$(t. $\tau$)/dt)).

For convenience, it may be represented as a sum total of the two orthogonal components $\cos[\omega^D t - \Delta\varphi_0]$ and $\sin[\omega^D t - \Delta\varphi_0]$ that are amplitude-modulated (DSB), respectively, with the orthogonal signals $\cos[\Delta\varphi_m(t. \tau)]$ and $\sin[\Delta\varphi_m(t. \tau)]$:

$$u^{hs}(t, \tau, \omega^D) = \tag{7a}$$
$$\cos[\omega^D t - \Delta\varphi_0]\cos[\Delta\varphi_m(t \cdot \tau)] + \sin[\omega^D t - \Delta\varphi_0]\sin[\Delta\varphi_m(t \cdot \tau)].$$

The spectrum of each summand (7a) has the depressed carrier frequency $\omega^D = 2\pi f^D$ (for the special case of immobile reflectors $\omega^D = 0$) and two side bands shifted (in relation to $\omega^D$) by the frequency $$\pm\omega_m^{hs}(t \cdot \tau) = \pm 2\pi f_m^{hs}(t \cdot \tau) = \pm d\Delta\phi_m(t \cdot \tau)/dt.$$

The upper frequency of the useful area of the homodyne signal $$f_\Sigma^{hs}$$

equals to the sum total of the maximum frequencies being the modulus of the Doppler shift frequency $$|f_{max}^D|,$$

and the modulation component of the homodyne signal $$f_{mmax}^{hs}:$$

$$f_\Sigma^{hs} = |f_{max}^D| + f_{mmax}^{hs}.$$

This value determining the requirements to the ADC sampling frequency determines, in our case, the ratio of the homodyne filter $f^{hf}$ cut-off frequency, and the permissible pulse repetition frequency of the probing signal $f_{am}$ $$f^{hf} \geq f_\Sigma^{hs} \ll f_{am}. \tag{9}$$

The output signal of the device is the sequence of fragments (7) resulting from filtration by the homodyne filter and homodyne signal amplifier with the total pulse response $h^{hf}(t)$. The function (spectrum) of the transceiver device output signal may be elaborated by computing the convolution of $h^{hf}(t)$ and (7) or multiplying the signal spectrum (7) by the complex transmission factor of the homodyne filter and the homodyne frequency amplifier. It is an additional operation resolved, on par with implementation of speed resolution of the reflectors determined by the duration of the fragment package, in the course of digital processing of the transceiver device output signal by the radar processor. The pulse response of the homodyne filter and the homodyne frequency amplifier may be used for performing additional analog processing operations with the homodyne signal (such as differentiation thereof).

For the primary version of the functional (structural) diagram of the transceiver device, please kindly see the sole figure. The transmitting channel of the device contains the following serially connected components: the PM probing signal generator 1, the power splitter 2, the pulse modulator 3 connected to one of the power splitter outputs and capable of maintaining the continuous emission mode, and the power amplifier 4 connected to the transceiver device output, and (via the latter) to the corresponding input of the radar antenna feeder arrangement. The input of each of the receiving channels of the device (a, b, etc.) connects to the corresponding output of the radar antenna feeder arrangement and includes the following serially connected components: mixers 5 (5a, 5b) connected to the corresponding outputs of the power splitter 2, the homodyne filter 6 (6a, 6b), the homodyne signal amplifier (HSA) 7 (7a, 7b), and the analog to digital converter (ADC) 8 (8a, 8b) connected to the radar processor. The analog or digital communication and transmitting channel parameter control lines connect the controller processor 9 to the phase-modulated signal generator 1, the pulse modulator 3 and the power amplifier 4, while the mode control input of the transceiver device connects the controller processor to the radar processor via the digital input/output. If the functions of the controller processor 9 are augmented, for example, with parameter controls of the HSA 7 or the homodyne filter 6 the controller processor is connected to them with additional circuits. The primary version of the structural diagram ensures operation of the transceiver device in the continuously emitted signal mode, and allows to increase the radar potential in the pulse mode as well as to measure the angular coordinate of the reflector relying on the signal phase difference in the two receiving channels.

Functions of individual assemblies of the device (such as the power converter and the pulse modulator, the homodyne signal amplifier and the homodyne filter) may be combined within the framework of the present invention and solutions known from the pertinent art. It is also feasible to include input low-noise amplifiers (either as individual assemblies or within the AFA or the TCD) into the receiving channels. At increased power level of the emitted signal, the TCD may include receiving channel protections known from the pertinent art (such as power limiters or key devices). The signal generator 1 may also have the simplest design (the generator controlled with the voltage of the controller processor ADC) and by way of direct digital synthesis of the PM signal.

DETAILED DESCRIPTION OF THE PREFERRED EMBODIMENTS

The device functioning is implemented as follows. The controller processor 9, under the radar processor program or on command of the operator, sets, depending on the values of the set distance resolution and maximum reflector distance, the duration $T_{frn}$ and function (1) of phase modulation $\varphi_{mn}(t)$ and (in the pulse mode) the pulse modulation form of each (i-th) fragment of the probing signal. The phase change pattern $\varphi_{mn}(t)$ may be a section of a linear, non-linear (such as harmonic), or random function. It is either generated by the radar processor or stored in its database. The QCP mode parameters (the modulation frequency, pulse form, and duty ratio) within the framework of the restriction (9) are selected depending on the radar technical requirements. The radar TCD design relying on selection $\varphi_{mn}(t)$ of the fragment requires computing the phase modulation component $\Delta\varphi_m(t. \tau_{max})=\varphi_m(t)-\varphi_m(t-\tau_{max})$, and the HS modulation component frequency $$\omega_m^{hs}(t \cdot \tau_{max}) = 2\pi f_m^{hs}(t \cdot \tau_{max}), \text{ where } \omega_m^{hs}(t \cdot \tau_{max}) = d\Delta\varphi_m(t \cdot \tau_{max})/dt,$$

and its maximum is determined $$f_{mmax}^{hs}.$$

The sum total of the modulation component and the modulus of Doppler component of the HS $$f_{\Sigma}^{hs} = f_{mmax}^{hs} + |f_{max}^D|$$

defines the maximum useful area of the HS spectrum and, therefore, the minimum cut-off frequency of the homodyne filter $f^{hf}$. The methodological principles of the correlation processing of the homodyne signal in the prototype system allow a certain degree $$f_{mmax}^{hs}$$

and $T_{fr}$ of control over each fragment by way of selecting $\varphi_{mn}(t)$ and modifying the sizes of the primary baseline signal matrix elements ($\Delta L$, $\Delta V$) while keeping unchanged (by selecting the matrix dimension) the set values of threshold distances and radial speeds of reflector.

The continuous microwave probing signal of the fragment (1) with its phase modulated under the pattern $\varphi_{mn}(t)$ generated in the transmitting channel of the TCD by the generator 1 is forwarded to the power splitter input 2 that transmit a portion of the PS power to the input of the two-mode (pulse or continuous signal) modulator 3. The modulator receives the TCD mode control signals from the TCD controller processor 9 that changes, respectively, the modes of the PM generator 1, the pulse modulator 3, and the power amplifier 4. The pulse (2) or continuous (1) signal from the output of the modulator 3 enters the input of the power amplifier 4. The output signal from the output of the TCD amplifier 4 the mean power of which controlled by the controller processor in the pulse mode may be greater than the one in the continuous mode is supplied to the input of the antenna feeder arrangement (AFA) and emitted into space. The received reflected signals from the AFA outputs enter the inputs of the TCD receiving channel mixers 5. As their number generally exceeds one they are marked with indexes (5a and 5b). The secondary inputs of the mixers receive the continuous heterodyne signal (1a) from the relevant outputs of the transmitting channel power splitter 2. The heterodyne filter 6 isolates the homodyne signal (7, 3a) from the output oscillation (6) (resulting from conversion) of the mixer (5) of each channel. The cut-off frequency $f^{hf}$ of the homodyne filter must satisfy the conditions (9) and (8) to guarantee depression of redundant high-frequency components of the HS exceeding $f^{hf}$. Further, it enters the input of the HS amplifier 7 and, from its output, goes to the analog to digital converter 8. The controller processor 9 receives the radar processor signals and gives the mode selection commands to the PM generator, pulse generator, and the power amplifier. The ADC 8 delivers the radar processor the HS channel fragments in digital format. As the duration of one fragment is generally insufficient for implementing the required reflector speed resolution values, the radar processor uses the fragment sequence.

INDUSTRIAL APPLICABILITY

The technical solutions of the present invention implement the first stage of the signal detection filtering (optimal processing) of the received reflected signal in any radio frequency range including the submillimeter one within the TCD with the continuous and pulse (QCD) emitted signal. The set of the TCD functional assemblies shown in the sole figure is the actual version of the device that ensures measurement of the distance, speed and one angular coordinate of the reflector in radars of various uses. Increasing the number of radar tasks may require increasing the number of TCD assemblies while preserving the structural solutions. Naturally, the proposed structure and algorithms of the TCD may be used also in exclusively pulse radars if no short-range operation is foreseen.

Groups of transceiver devices may be included into complex radar suites. These include, for example, giant-pulse radars, MIMO radars, etc. Here, functions of some TCD assemblies such as the controller processor may be delegated to radar assemblies. The function of output signals from homodyne filter and, therefore, the TCD output signals does not change materially when switching from the continuous emission mode to the pulse mode, which is the objective of the present invention.

The invention claimed is:
1. A transceiver device for a homodyne radar, comprising:
a transmitting and receiving channel connected via a microwave output and a microwave input to a radar antenna feeder arrangement,
a transmitting channel connected to the microwave output of the device, and comprises a master generator of a microwave probing signal in the form of a sequence of phase modulated fragments, a controller processor connected to a generator phase control input and a radar processor, and a power splitter with input connected to a generator output and one of a plurality of outputs connected to the microwave output of the device, the receiving channel connected to the microwave input of the device comprises following serially connected components:

a mixer with input connected to the microwave input of the device and output of the power splitter, a homodyne signal amplifier, and an analog to digital converter connected to a digital output of the device;

wherein the transmitting channel between a power splitter output and a device output additionally comprises a pulse modulator and a power amplifier wherein the pulse modulator and an output power control circuit connect to the controller processor;

the receiving channel between a mixer output and the homodyne signal amplifier additionally comprises a homodyne filter depressing spectral components of a mixer signal that exceed a cut-off frequency of the homodyne filter set to be lesser than a pulse modulation frequency but greater than a maximum frequency of a homodyne fragment signal calculated for reflectors with maximum set values of distances and radial speeds.

* * * * *